US006003809A

United States Patent [19]

Honigsbaum

[11] Patent Number: 6,003,809

[45] Date of Patent: Dec. 21, 1999

[54] PROCESS AND APPARATUS FOR DISCOURAGING COUNTERMEASURES AGAINST A WEAPON TRANSPORT DEVICE

[76] Inventor: Richard F. Honigsbaum, A-21 Barry Gardens, 245 Passiac Ave., Passaic, N.J. 07055

[21] Appl. No.: 08/804,635

[22] Filed: Feb. 25, 1997

[51] Int. Cl.[6] .............................. F41G 7/00; B64D 1/04; F42B 15/10; F42B 45/00

[52] U.S. Cl. ........................ 244/3.15; 244/3.11; 89/1.11; 102/377; 102/382; 102/393; 102/293; 376/914

[58] Field of Search ................................ 244/3.16, 3.15, 244/3.11, 3.1; 376/100, 914, 102; 89/1.11, 1.14, 1.1; 102/374, 364, 365, 382, 393, 377, 378, 265, 270, 293

[56] References Cited

U.S. PATENT DOCUMENTS

| | | | |
|---|---|---|---|
| 2,745,369 | 5/1956 | Brown et al. | 114/21 |
| 2,870,710 | 1/1959 | Miedel | 102/393 |
| 3,176,573 | 4/1965 | Dickie | 89/1.14 |
| 3,218,927 | 11/1965 | Stott | 89/1.14 |
| 3,254,555 | 6/1966 | Joneikis | 89/1.14 |
| 3,865,035 | 2/1975 | Munson et al. | 102/364 |
| 3,980,019 | 9/1976 | Anderson et al. | 102/393 |
| 3,981,244 | 9/1976 | Adimari et al. | 102/69 |
| 4,003,291 | 1/1977 | Vass et al. | 89/1.81 |
| 4,185,538 | 1/1980 | Barakauskas | 89/1.81 |
| 4,417,520 | 11/1983 | Maudal | 102/489 |
| 4,522,356 | 6/1985 | Lair et al. | 244/3.15 |
| 4,524,694 | 6/1985 | Boeder | 102/393 |
| 4,583,461 | 4/1986 | Weber | 102/489 |
| 4,616,567 | 10/1986 | Romer et al. | 102/489 |
| 4,625,646 | 12/1986 | Pinson | 102/489 |
| 4,638,737 | 1/1987 | McIngvale | 102/489 |
| 4,791,850 | 12/1988 | Minovitch | 89/8 |
| 4,799,429 | 1/1989 | LaBudde et al. | 102/39 |
| 4,829,905 | 5/1989 | Lew et al. | 102/489 |
| 4,967,667 | 11/1990 | Horwath | 89/1.11 |
| 4,988,058 | 1/1991 | Dirscherl et al. | 244/3.16 |
| 5,067,411 | 11/1991 | Ball | 102/489 |
| 5,109,749 | 5/1992 | Olcer | 89/1.14 |
| 5,160,803 | 11/1992 | Fulchiron et al. | 102/363 |
| 5,271,330 | 12/1993 | Keller | 102/374 |
| 5,458,041 | 10/1995 | Sun et al. | 89/1.11 |
| 5,619,010 | 4/1997 | Holm et al. | 102/489 |

OTHER PUBLICATIONS

McGraw–Hill Encyclopedia of Science and Technology, McGraw–Hill, New York, N.Y., 1971, vol. 9, p. 206 and vol. 11, pp. 298 and 316.

H. Kahn, "On Thermonuclear War, 2nd Edition", Princeton University, 1961, p. 50.

F.J. Cook, "The Warfare State", MacMillan, New York, N.Y., 1962, p. 343.

N. Calder, "Unless Peace Comes", Viking Press, 1968, p. 53.

B. Beckett, "Weapons of Tomorrow", Plenum Press, New York, N.Y., 1983, p. 100–101.

K.P. Werrell, "The Evolution of the Cruise Missile", Air University Press, Maxwell AFB, AL 1985, pp. 136, 186, 206–207, 268–269, 275, 277, 279.

"Weapons an international encyclopedia from 5000 BC to 2000 AD", the Diagram Group, St. Martin's Press, New York, 1980.

"The New York Times", Mar. 25, 1996, p. C7.

"Jane's Weapons Systems", 17th Ed. 1986–1987, pp. 442–444.

E. Luttwak et al., "The Dictionary of Modern War", Harper Collins, 1991, pp. 85–87, 115–118, 430–438, 616–617.

*Primary Examiner*—Charles T. Jordan
*Assistant Examiner*—Theresa M. Wesson
*Attorney, Agent, or Firm*—Cohen, Pontani, Lieberman & Pavane

[57] ABSTRACT

A weapon transport device transports along a path toward a target in hostile territory, (1) a target-intended weapon and (2) biological, chemical and/or radioactive agents for attacking the occupants of such territory should they execute countermeasures against the weapon transport device. Separation of the biological, chemical and/or radioactive agents is initiated or, where appropriate, inhibited, by signals from either the guidance system of the transport device or from on-board Global Positioning System (GPS) receivers when the transport device strays by more than a predetermined distance from the path, the sensor is blinded, or the transport device passes beyond a predetermined point while en route to the target.

16 Claims, 4 Drawing Sheets

PROCESS AND APPARATUS FOR DISCOURAGING COUNTERMEASURES AGAINST A WEAPON TRANSPORT DEVICE

BACKGROUND OF THE INVENTION

1. Field of the Invention

This invention relates to weapon transport devices for transporting target-intended weapons along paths toward targets and more particularly to weapon transport devices for transporting target-intended weapons along paths toward targets embedded in hostile territories, and that respond to countermeasures by attacking the occupants of those territories with means other than those target-intended weapons.

2. Description of the Related Art

Transport devices for transporting a plurality of weapons along paths toward their targets are familiar from the patent literature, and examples include Adimari, U.S Pat. No. 3,981,244; Lair et al., U.S. Pat. No. 4,522,356; Boeder, U.S. Pat. No. 4,524,694; Romer et al., U.S. Pat. No. 4,616,567; Pinson, U.S. Pat. No. 4,625,646; McIngvale, U.S. Pat. No. 4,638,737; Minovitch, U.S. Pat. No. 4,791,850; and Lew et al., U.S. Pat. No. 4,829,905.

Adimari teaches an arrangement for dispensing submunitions from projectiles, Boeder and Romer from bombs, Lew, Lair, Pinson and McIngvale from missiles, and Minovitch from electromagnetically launched canisters. While the actual submunitions of all of these arrangements are target directed, Lew teaches a MIRVed (Multiple Independent Renentry Vehicle) ICBM that also dispenses dummy warheads. Each of these arrangements, however, is made more effective by submunition separation, and thus, unlike the present invention, invites attack before separation, i.e., with all of the submunitions still aboard the weapon transport device.

While the present invention can discourage countermeasures against not only the transport devices mentioned but also against almost any such devices for transporting target-intended weapons toward targets, some of these transport devices are more effectively served by some of the features of this invention than by others. The TOMAHAWK cruise missile was chosen for purposes of illustrating and explaining this invention because it can be effectively served by all of the features of the present invention.

Cruise missiles are described in *Janes' Weapons Systems*, 17th Edition, 1986–7, in greater detail in *The Evolution of the Cruise Missile*, Werrell, Kenneth P., Air University Press, Maxwell AFB 1985, and elsewhere. These references not only describe these missiles and their operating systems, subsystems and payloads, they also make it clear that cruise missiles such as the TOMAHAWK can transport various kinds of munitions and submunitions, some of which, including nuclear, are of interest here.

The weapon transport devices of the present invention respond to countermeasures by dispensing biological, chemical, or radioactive substances, with salvage-fusing arrangements that scatter radioactive substances or increase the neutron production of nuclear payloads, or with combinations of these responses. Biological and chemical agents are described in *Weapons,* St. Martin's Press, New York 1980, as is the neutron option, and "salvage-fusing" is explained in *The New York Times*, Tuesday, Mar. 25, 1986.

Some of the countermeasure-discouraging arrangements of this invention are activated by separation from weapon transport devices, and others by detonation of the weapons being transported thereby. Separation is initiated or, where appropriate, inhibited, by signals from either the guidance systems of the transport devices or from on-board Global Positioning System (GPS) receivers. Separation is effected via solenoid valve actuated spray nozzles, by energizing explosive bolts, by solenoid latches that otherwise secure detachably secured canisters to the weapon transport devices, etc. These GPS receivers, solenoid valve activated spray nozzles, explosive bolts such as those that detachably secure hatches to military and space vehicles, and solenoid latches such as those found on car trunks and apartment house doors are, of course, familiar devices, the details of which are well known to persons having ordinary skill in the art.

SUMMARY OF THE INVENTION

According to this invention, I have developed weapon transport devices that transport not only weapons for attacking targets, but also means for attacking the occupants of the hostile territories in which the targets are embedded. This multiple attack arrangement is exploited in the preferred embodiments in a way that discourages countermeasures against these weapon transport devices and the weapons being transported thereby.

According to a first preferred embodiment of this invention a weapon transport device, typically a cruise missile intended to transport a high explosive, incendiary, or nuclear weapon toward a target via a path, a portion of which is over hostile territory, also transports biological or chemical agents that are used to attack the occupants of that territory in response to countermeasures against the device. If, however, those countermeasures are ineffective or withheld, the biological or chemical agents are retained aboard the transport device as is the target-intended weapon, these agents being incinerated when the weapon attacks its target.

According to a second preferred embodiment of this invention, a weapon transport device, typically a cruise missile, a ballistic missile, the submunitions of a MIRVed ICBM, or a "smart" bomb intended to transport a high explosive or nuclear weapon toward a target via a path, a portion of which is over hostile territory, also transports a radioactive material or a material made radioactive by the detonation of a nuclear weapon. This radioactive material, or the material made so by detonation, is scattered over that territory by detonation of the target-intended weapon in response to countermeasures. If, however, countermeasures are ineffective or withheld, the radioactive material or the material made so by detonation is separated from the weapon transport device when that device passes beyond a predetermined point while en route toward that target, and the target-directed weapon attacks its target with minimal scattering of the radioactive material.

According to yet another preferred embodiment of this invention, the weapon transport device transports a "salvage-fused" and target-intended high explosive or nuclear weapon, biological or chemical agents, and a radioactive substance scattered by the detonation of the target-intended weapon. Nondestructive countermeasures are addressed with the biological or chemical agents alone, and destructive countermeasures are addressed by the scattering previously mentioned as part of the "salvage-fused" response. If, however, the countermeasures are ineffective or withheld, the radioactive substance is separated from the target-intended weapon when the weapon transport device passes beyond a predetermined point while en route toward its target, and the biological or chemical agents are incinerated by that weapon when the target is attacked.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

DETAILED DESCRIPTION OF THE PRESENTLY PREFERRED EMBODIMENTS

Figure 1:
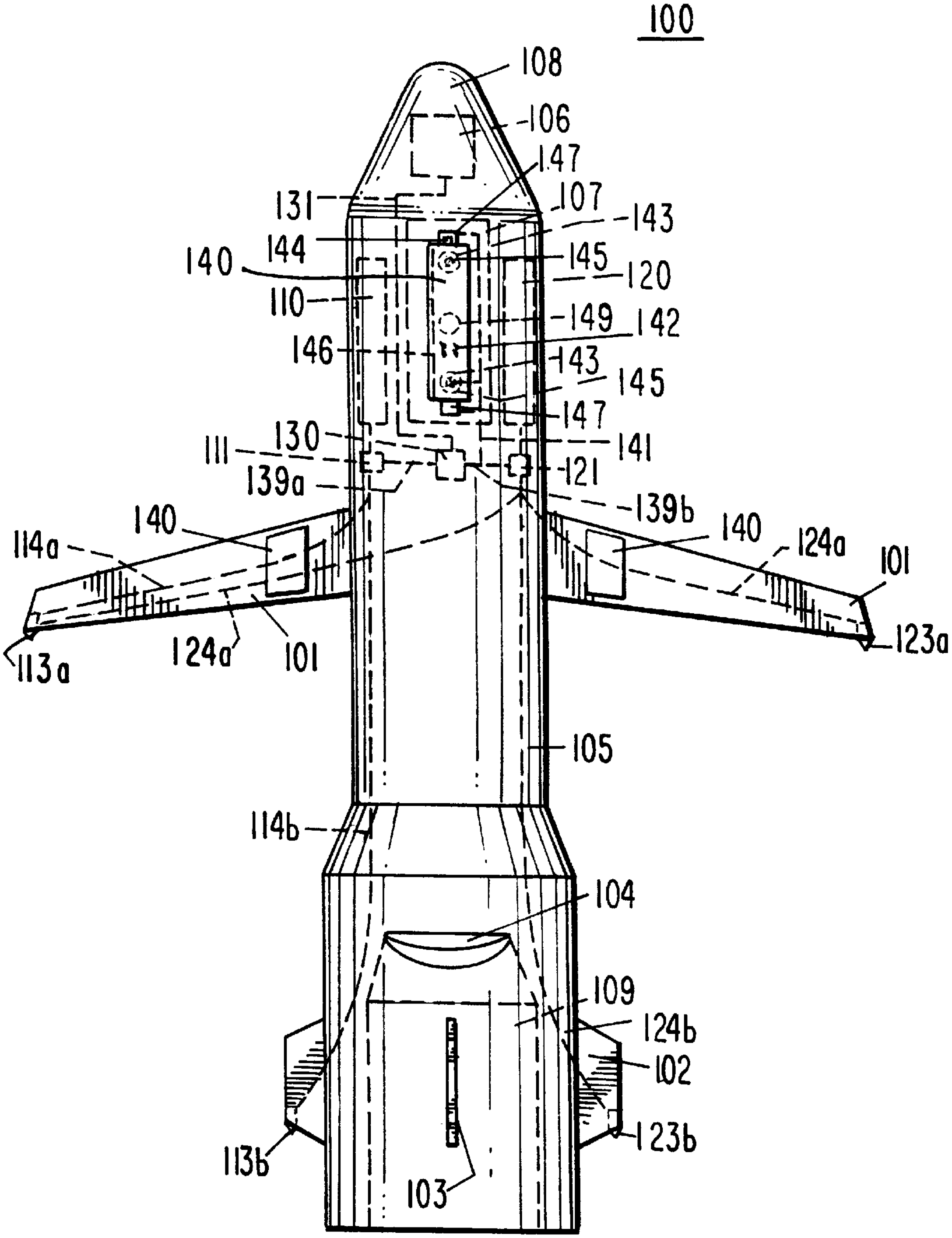
FIG. 1 is a plan view of the underside of a weapon transport device having a first countermeasure-discouraging arrangement in accordance with the present invention.

Turning now to the drawings, the embodiment of FIG. 1 is a weapon transport device in accordance with this invention, and is generally designated by the reference numeral 100.

Because the TOMAHAWK cruise missile (AGM/BGM 109) is known not only from the literature, but also from its remarkable performance in the recent Gulf War, it is clear that the details of its design, manufacture, deployment, and use, and also those of its systems, subsystems, components, and payloads are known to persons having ordinary skill in the art; therefore, the TOMAHAWK cruise missile is the weapon transport device of choice for purposes of illustrating and explaining the practice of the present invention. Further, since these details are known to those persons, most of these details have been omitted from, and some have been exaggerated or distorted in the drawings and in this description for purposes of clarity of illustration and brevity of description.

The TOMAHAWK cruise missile has a modular body 105 as mentioned, folding wings 101, and retractable horizontal and vertical tail fins 102, 103 respectively. The body modules include the nose module 108 that houses guidance system 106 shown in the drawing as a "black box", the weapons module that comprises the portion of body 105 between the nose module 108 and wings 101 and that houses the weapon or weapons represented by "black box" 107, and the propulsion module that comprises the portion of body 105 aft of wings 101 and that houses the WILLIAMS INTERNATIONAL F107WR400 turbofan engine represented by "black box" 109 in the drawing and, of course, a fuel tank for that engine. Some TOMAHAWKS, submarine-launched versions in particular, also have a rocket engine that supplies the initial boost and then separates from the missile. In ballistic missile embodiments of this invention, rocket engines of course provide all of the propulsive thrust. The retractable air intake 104 for the engine of the TOMAHAWK extends from its underside during normal flight.

Guidance for the TOMAHAWK provided by an inertial system that is periodically updated by a Terrain Contour Matching System (TERCOM), an optical scene matching system or, where appropriate, a target acquisition radar. It should be noted, however, that these updating systems can be compromised by "blinding" their electromagnetic sensors: the target acquisition radar and the TERCOM radar altimeter by jamming, and the optical scene matching system by obscuring actual scenes with smoke. Smoke can, of course, also blind the sensors of the laser-guided "smart bomb" embodiments of this invention.

The weapons transportable by the TOMAHAWKS cover the spectrum from nuclear in models BGM 109A and G, high explosive in BGM 109C, anti-personnel/anti-material submunitions in BGM 109D and magnesium-based incendiary in BGM 109E, to runway-cratering submunitions in BGM 109F. Because some of these target-intended weapons are configured differently from others, and all are known to persons having ordinary skill in the art, the target-intended weapons being transported by the weapon transport devices of this invention are represented by "black box" 107 in the drawing.

The embodiments of FIG. 1 are intended to attack fixed targets embedded in hostile territories, and to respond to countermeasures by attacking the occupants of those territories with biological and/or chemical weapons.

The biological and chemical agents of these weapons, such as, for example, Sarin, botulin, plague, the other such agents mentioned in the *Weapons* reference, and even more effective agents the existence of which has been rumored but not formally acknowledged, can be housed aboard and dispensed from the weapon transport device in several ways. In one presently preferred arrangement these agents are housed in canisters 110, 120 as, or dispersed in, volatile liquids, as microencapsulations or finely divided solids so dispersed, etc., the details of which are well known to persons having ordinary skill in the arts of biological and chemical weaponry. These agents are delivered to dispensing nozzles 113*a*, 113*b*, 123*a*, 123*b* via conduits 114*a*, 114*b*, 124*a*, 124*b* when solenoid valves 111, 121 are opened.

These valves are opened when their solenoid coils are energized by energizer 130 via the power buses 139*a*, 139*b* in response to a signal to do so from guidance system 106 via signal bus 131, or, depending upon power levels available and required, by that signal directly.

This signal is sent when the electromagnetic sensors previously mentioned are blinded, when the weapon transport device has strayed by more than a predetermined distance from its predetermined path because of that blinding, a crippling attack, etc.

Nozzles 113*a* and 123*a* are shown mounted near the outboard edges of the trailing portions of wings 101, and nozzles 113*b* and 123*b* are similarly mounted with respect to horizontal fins 102. Such mountings are preferred because they make it less likely that agents dispensed via the nozzles will be ingested by turbine air intakes, or become otherwise entrained in the exhaust streams of the turbines, and be incinerated thereby. Because wings 101 and fins 102 fold or otherwise retract into body 105, conduits 114*a*, 114*b*, 124*a*, 124*b* are preferably made of flexible tubing, or otherwise constructed to accommodate this.

Each of the nozzles 113*a*, 113*b*, 123*a*, 123*b* is shown fed from one or the other of canisters 110, 120 excepting nozzle 113*a*, which is shown fed from both. This dual feed arrangement is intended for embodiments where the agent to be dispensed is a lethal combination of two relatively innocuous agents, where the contents of one canister is the propellant for that of the other, for purposes of redundancy, etc.

The embodiment of FIG. 1 described thus far is an arrangement in which all the parts of the countermeasure discouraging system, portions of the nozzles excepted, are inside the skin of weapon transport device 100, and this internal arrangement is preferred when the external dimensions and the aerodynamic contours of the transport device must be preserved. The canisters 110, 120 which are, of course, the bulkiest parts of the system, and could otherwise compromise these dimensions or these contours, are shaped to fit the space available or replaced with a collection of smaller ones that do. This internal arrangement does not, however, readily accommodate those biological and chemical agents that are most effective when dispersed at or near "ground zero".

Such agents are, however, effectively accommodated by externally mounted canisters 140 that are detachably secured to the transport device and that rupture when they hit the ground, or by canisters that release their contents in other ways, those ways being dictated by how the agents they contain are packaged. Thus pressurized agents could be released not only by canister rupture, but alternately by impact-actuated valve 144 or by impact-detonated scattering charge 146, while frangible and/or water-soluble capsules or tablets 142 could, for example, be released by simply opening the canisters.

Canisters 140, contoured to preserve critical dimensions, to reduce aerodynamic drag, or to fit into depressions in the skin of the weapon transport device put there for such purpose, are held closed and/or detachably secured to that device by explosive bolts 145, by solenoid latches 147, etc. Release is effected when these bolts, latches, etc. are actuated by energizer 130 via bus 141, this release being assisted by optional compression springs 143 that serve to separate the canisters 140 from device 100. When canisters 140 serve as containers for capsules, tablets, etc. that are intended to be released in midair, canisters 140 are containers that are split for the purpose, say along the edges shown, and are held closed by bolts, latches, etc. of the kind mentioned previously, and opened by energizing these bolts, latches, etc., that opening being assisted by optional additional springs 149, or by springs 143 relocated for such purpose. While latches, springs, etc. are shown on only one of the canisters 140 in FIG. 1, it is of course understood that opening and/or separation accommodations could be provided for all of them.

In those embodiments where their dimensional and aerodynamic effects can be tolerated, suitably fused projectile portions of biological or chemical artillery rounds could, of course, be substituted for canisters 140.

The biological and chemical agents of this embodiment are, as should now be clear, used against the occupants of hostile territory in response to countermeasures that blind the electromagnetic sensors of the guidance systems or that cause course errors of more than a predetermined amount, and are incinerated by the target-intended weapons being transported by the weapon transport devices when these countermeasures are withheld. This incineration is preferably initiated with both the target-intended weapons and the biological and chemical agents aboard the weapon transport device, and with target-intended weapons that produce enough heat to do so, i.e., high explosive or nuclear.

While the embodiments of FIG. 1 discourage countermeasures of the kind mentioned, they encourage countermeasures that both attack these embodiments and incinerate their countermeasure-discouraging agents. Although weapons that can attack weapon transport devices such as those of FIG. 1 effectively have not been demonstrated publicly and may not even presently exist, it is not unreasonable to expect their use in future conflicts, and the matter of discouraging that use is addressed by the embodiments of FIG. 2.

Figure 2:
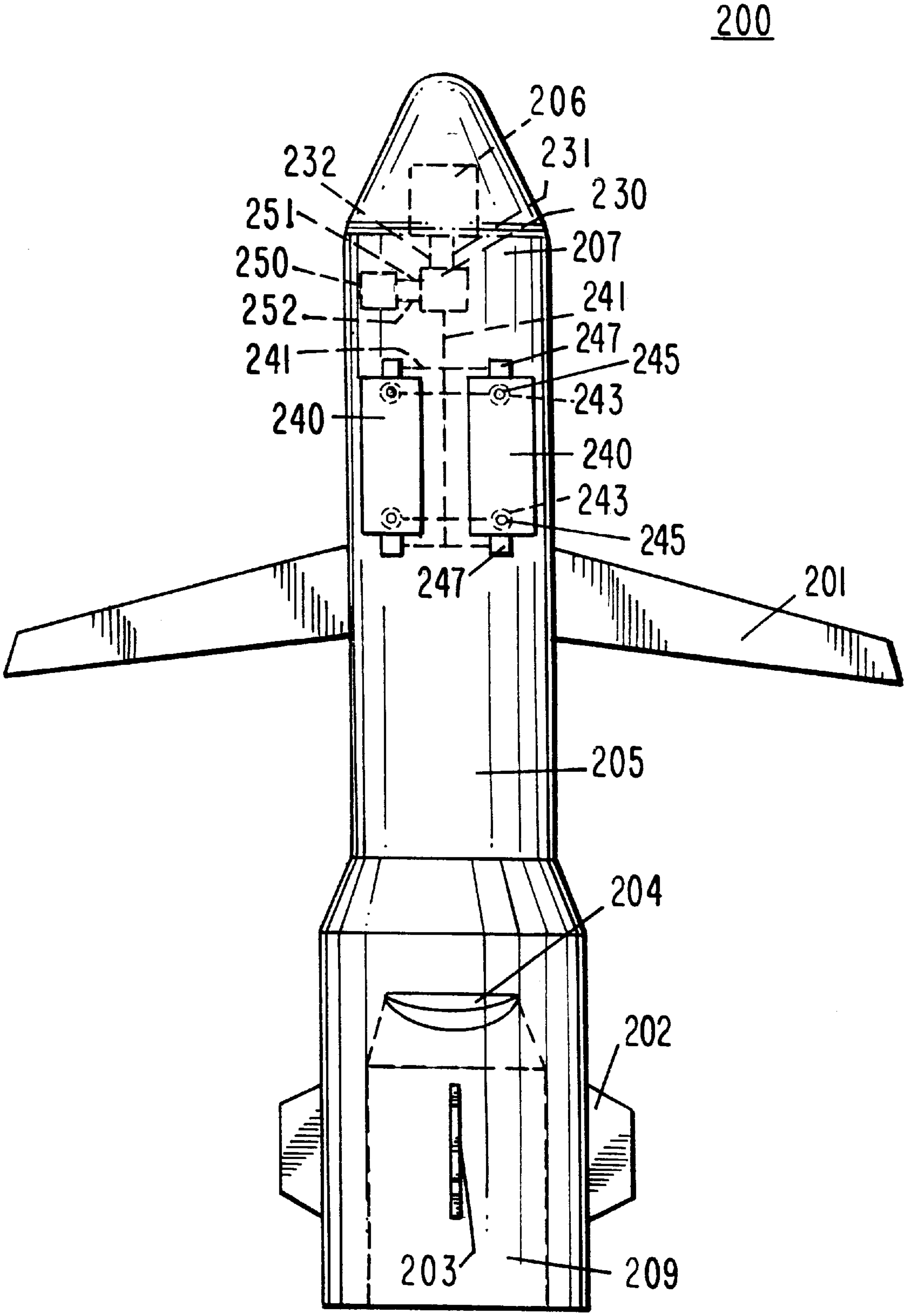
FIG. 2 is a plan view of the underside of a weapon transport device having a second countermeasure-discouraging arrangement in accordance with the present invention.

The FIG. 2 drawing is also intended to represent the underside of a TOMAHAWK cruise missile modified in accordance with this invention, and is generally designated by the reference numeral 200. While that particular missile was chosen for purposes of illustration, description, and explanation for reasons mentioned earlier, persons having ordinary skill in the art will recognize that the FIG. 2 countermeasure-discouraging arrangements are also applicable to orbital and sub-orbital weapon transport devices and their payloads.

The countermeasure-discouraging agents of the FIG. 2 embodiments are the radioactive isotopes of elements such as cesium, cobalt, iodine, and strontium, radioactive elements such as plutonium, elements such as cobalt that are made radioactive by the detonation of one or more of the weapons being transported, substances that increase the neutron yield of those weapons, etc., the choice of agents being dictated by the kinds of target-intended weapons being transported, i.e., corresponding to "black box" 107 of FIG. 1, and, for the FIG. 2 embodiments, high-explosive or nuclear. The arrangements for storing these agents aboard the device are similarly dictated.

If, for example, the target-intended weapons are high-explosive, the countermeasure-discouraging agents would be radioactive elements that contaminate hostile territories when they are scattered by the explosion of the target-intended weapons, the weapons that attack the transport devices, or both. When countermeasures are withheld, the radioactive elements are separated from these devices and/or their target-intended weapons and fall to earth confined to their containers.

The radioactive isotopes are transported aboard devices 200 in suitably shaped canisters 240 such as the canisters 140 of FIG. 1, as castings or fabrications of the elements themselves, etc., and are detachably secured to the transport devices by either the explosive bolt 245 and spring 243 arrangements or the solenoid latch 247 and spring 243 arrangements corresponding to those of FIG. 1. Here too, separation is effected when energizer 230 energizes explosive bolts 245 and/or solenoid latches 247 via power buses 241 in response to signals from guidance system 206 via a first signal bus 231. Here, however, that signal is sent when the transport device passes a predetermined point along its predetermined path toward its target, and that point is preferably one beyond which the explosion of the target-intended weapon or weapons can seriously damage or completely destroy that target. That separating signal can alternately be supplied by GPS receiver 250 via bus 251, and the GPS arrangement obviates the need for a signal from guidance system 206, and any need to modify the guidance system 206 to supply it.

FIG. 2 also shows a second signal bus 232 connecting guidance system 206 with energizer 230, and a corresponding second bus 252 from GPS receiver 250. These second buses are particularly intended for transport devices having inertial guidance systems (e.g., the TOMAHAWKS), the accuracies of which are upgraded say by periodic terrain contour matching (TERCOM), optical scene matching, etc.

While these transport devices could be programmed to detonate their target-intended weapons in response to countermeasures that blind the sensors of their upgrading arrangements, or to course errors, perhaps resulting from that blinding, exceeding a predetermined amount, such responses preclude any possibility of attacking the targets, which is, of course, the purpose of the device. So the more appropriate responses are those in which the "blinded" signals or the course error signals are sent to latch open the relays in energizer 230 that correspond to relays 493*b* of the embodiments of FIG. 4, and thus prevent separation of the countermeasure-discouraging agents.

Radioactive elements can also serve as the countermeasure-discouraging agents when the target-intended weapons are nuclear, but devices transporting such weapons are better served by agents that are made radioactive by the detonation of those weapons, or by those that increase the neutron yield of such weapons, but are otherwise benign. While other such agents are known, common cobalt is of particular interest because it can be housed and separated not only as in the FIG. 2 embodiments previously described, but also as the finely divided substance in a spray arrangement like that of FIG. 1. The separation initiating signal, of course, would be that of FIG. 2.

This spray arrangement has several advantages here that offset its complication, the most important being separation in a form that is not only benign, but also, and unlike canisters 240 and their contents, not readily recoverable for use in the same way by the occupants under attack. While canister-and-content recycling can be addressed by smaller versions of the impact-detonated scattering charges 146 of FIG. 1, by impact-rupturing canisters the contents of which soak into the ground, etc., the result is still a scattering of radioactive material, albeit over a small area, while the spraying of common cobalt is not.

In the embodiments described thus far, the countermeasure-discouraging means are detachably secured to the transport device and the target-intended weapons are retained aboard the device. There is, however, nothing inherent in the invention that prohibits reversal of this arrangement, and some embodiments are better served by so doing.

The *Werrell* reference, for example, describes a missile, TOMAHAWK model BGM 109F in particular, that sequentially releases submunitions for purposes of attacking strip targets such as airport runways, and a missile on such a mission would be better served by fixedly securing FIG. 2 countermeasure-discouraging means to the transport device, say by replacing explosive bolts 245 with ordinary ones, and by both impact fusing and "salvage-fusing" the submunition intended for release last.

In another such example the target-intended weapons are nuclear, say detachably secured projectile portions of nuclear artillery rounds that replace one or more of the canisters 240, the others, those containing the countermeasure-discouraging agents, being fixedly secured to the device. Weapon separation is initiated when the device passes a predetermined point on its predetermined path such that, allowing for release time, etc., the free-fall paths of these projectile portions take them to their targets. Where the countermeasure-discouraging agent of this example is common cobalt, that element could, of course, also or alternately be transported aboard the device as a component of the alloys comprising its parts.

Figure 3:
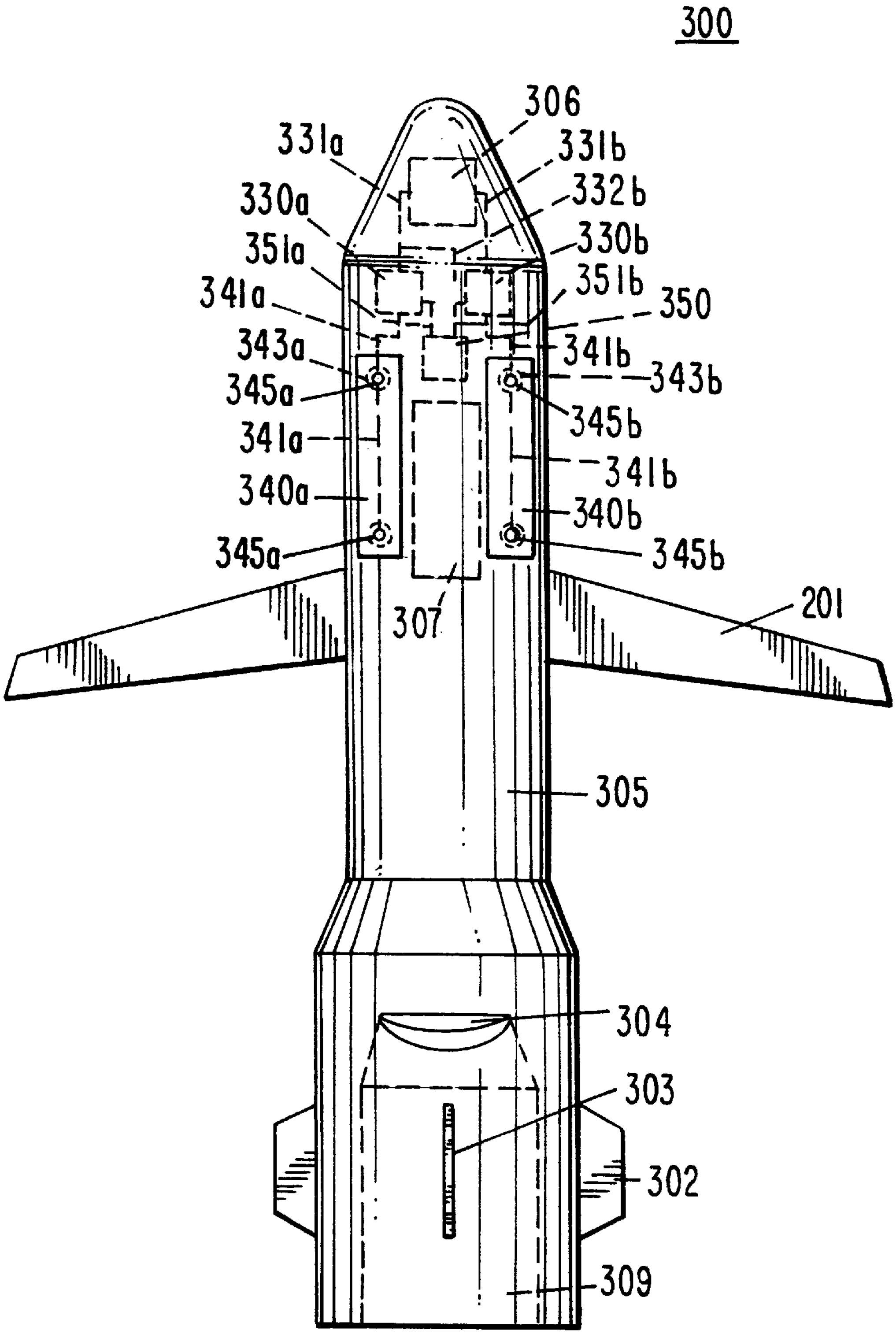
FIG. 3 is a plan view of the underside of a weapon transport device having the countermeasure-discouraging arrangements of FIGS. 1 and 2.

The embodiments of FIG. 3 combine the countermeasure-discouraging arrangements of FIG. 1 with those of FIG. 2, and address the shortcomings of both. The FIG. 1 arrangements will, for reasons mentioned, invite, rather than discourage, destructive attack when the means to do so become available. The FIG. 1 arrangements do, however, discourage countermeasures that blind their electromagnetic sensors, or otherwise compromise their guidance systems. Further, FIG. 1 embodiments that survive such countermeasures can attack their targets. While the FIG. 2 embodiments discourage destructive attack, they cannot immediately respond to guidance-system-compromising countermeasures applied at some distance from their targets without sacrificing their primary mission, which is, of course, that of attacking those targets.

Because the FIG. 3 embodiments combine the countermeasure-discouraging arrangements of FIG. 1 with those of FIG. 2, they respond to destructive attack by scattering radioactive material at the point of attack, and to guidance-system-compromising countermeasures not only by dispensing FIG. 1 agents immediately, but also by scattering radioactive material when the target is attacked, or elsewhere when not.

The FIG. 3 drawing is also, for reasons explained, intended to represent the underside of a TOMAHAWK cruise missile that has been modified in accordance with this invention, and is generally designated by the reference numeral 300 in that drawing. Because the FIG. 3 embodiments combine the countermeasure-discouraging arrangements of FIGS. 1 and 2, and those previous embodiments have been described in detail, only two canisters are shown in FIG. 3, one, 340*a*, for the biological or chemical agents, and the other, 340*b*, for the radioactivity-related materials. These canisters are shown detachably secured to the transport device by explosive bolts 345*a* and 345*b*, separation being assisted by optional compression springs 343*a* and 343*b*. Despite this minimal representation, the other countermeasure-discouraging arrangements of the previous embodiments are also, of course, applicable here.

The target-intended weapons of the FIG. 3 embodiments are one or more of those of FIG. 2, i.e., high explosive or nuclear, and these weapons are assumed to comprise a portion of, or to be housed in, the weapon module portions 307 of the bodies 305 of weapon transport devices 300. These target-intended weapons are also preferably both impact and "salvage" fused, and, like those of the embodiments of FIG. 2, respond to destructive attack by detonating, thus scattering radioactive material, here the contents of canister 340*b*, over the hostile territory previously mentioned.

The canisters 340*a* and 340*b* are separated from weapon transport device 300 by springs 343*a* and 343*b* when explosive bolts 345*a* and 345*b* are energized by their respective energizers 330*a* and 330*b* via power buses 341*a* and 341*b*, and this energization is initiated by signals from guidance system 306 via signal buses 331*a* and 331*b*, and/or from GPS receiver 350 via signal buses 351*a* and 351*b*. While the response of the FIG. 3 embodiments to countermeasures applied or withheld can be gleaned from the descriptions of the embodiment of FIGS. 1 and 2, they are explained in detail with reference to FIG. 4.

Figure 4:
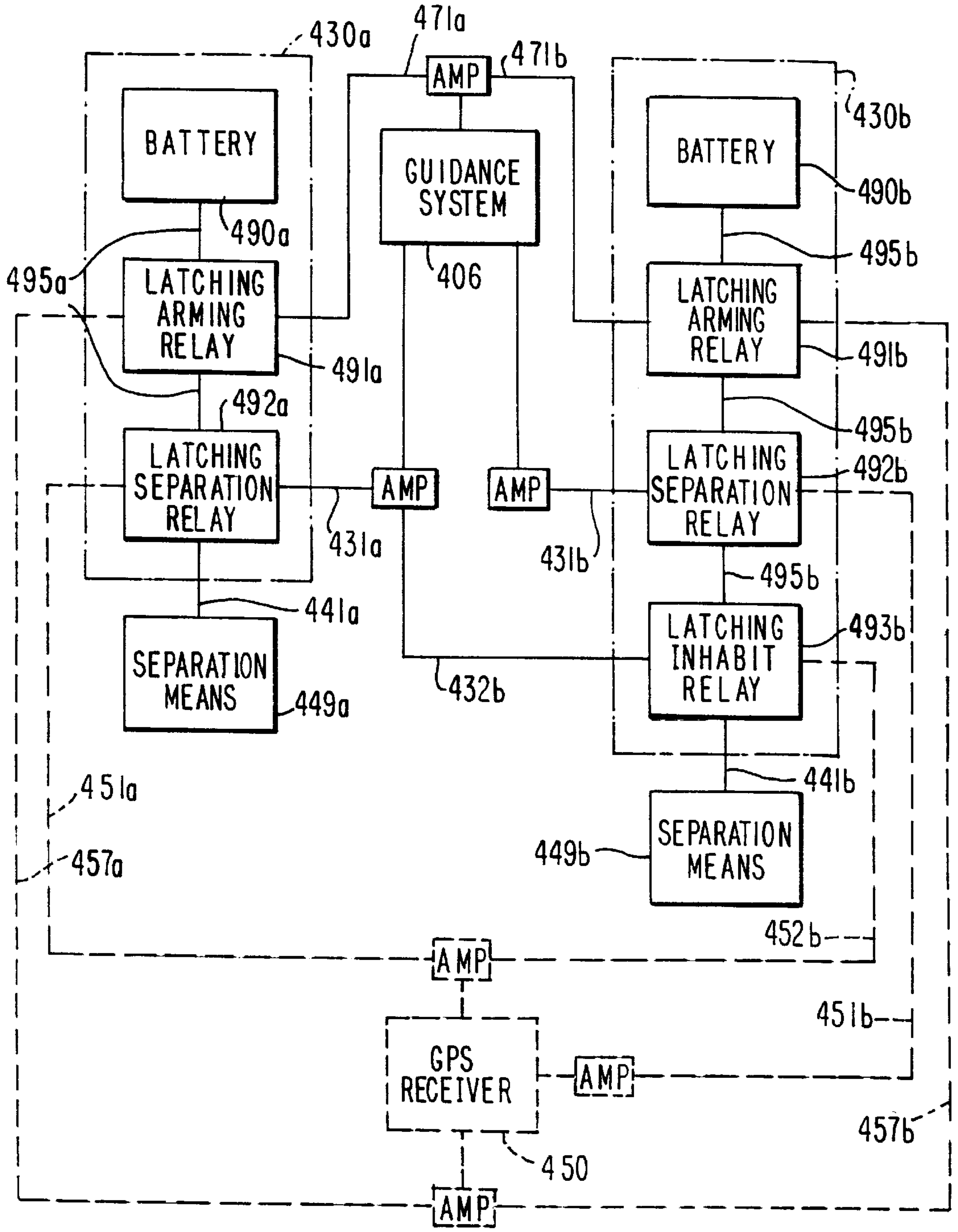
FIG. 4 is a block diagram of the separation circuitry for the weapon transport devices of FIGS. 1, 2 and 3.

FIG. 4 is a block diagram of the separation circuitry for the embodiments of FIG. 3, and while its embodiment is a relay version of that circuitry, persons having ordinary skill in the art will recognize that the relays can be replaced with solid state elements. The FIG. 4 circuitry can also serve embodiments of this invention other than those of FIG. 3.

In the FIG. 4 drawing, the numerical designation of the parts and paths that effect separation of the biological or chemical agents bear the suffix "a", those that effect separation of the radioactive material or the material made radioactive by the target-directed weapons bear the suffix "b", and those common to both have no suffix at all. Thus the FIG. 4 circuitry serves the FIG. 1 embodiments when the "b" suffixed parts and paths are omitted or ignored, the FIG. 2 embodiments when the "a" suffixed parts and paths are omitted or ignored, and the FIG. 3 embodiments as drawn.

The biological and chemical agents of the FIGS. 1 and 3 embodiments are separated from their respective weapon transport devices when their explosive bolts, solenoid latches, or solenoid valves, represented by block 449*a* in FIG. 4, are energized by energizer 430*a* via power bus 441*a*, and the countermeasure-discouraging agents of the FIG. 2 embodiments and the FIG. 2-like portions of the FIG. 3 embodiments are similarly separated when the corresponding separation means, represented by block 449*b* in FIG. 4, are energized by energizer 430*b* via power bus 441*b*. Each of these energizers, 430*a* and 430*b*, is represented by the long dash-short dash blocks in the drawing, and each contains series-connected electrical elements comprising batteries 490*a*, 490*b*, latching arming relays 491*a*, 491*b*, latching separation relays 492*a*, 492*b*, internal power bus segments 495*a*, 495*b*, and the energizer ends of the power buses 441*a* and 441*b* that connect these energizers to their respective separation means, i.e., to block 449*a* or 449*b*. Energizer 430*b* also contains the series-connected latching inhibit relay 493*b* shown. These relays are actuated by signals from guidance system 406, GPS receiver 450, or both; the guidance system and the signal paths from it are represented by fine solid lines in the drawing, and the GPS receiver and its signal paths by fine dashed ones.

The arming relays in FIG. 4 reduce the risk of a "friendly fire" response. Absent these relays, countermeasures applied too close to the launch points of the weapon transport devices could, for example, subject the launch crews, the occupants of friendly territory, or both, to lethal countermeasure-discouraging agents. Thus the signals from guidance system 406 via signal paths 471*a*, 471*b*, or from GPS receiver 450 via paths 457*a*, 457*b* that close arming relays 491*a*, 491*b* are preferably delayed until guidance system 406 or GPS receiver 450 confirms that the weapon transport device has passed a predetermined point on its path toward its target, that point being one beyond which the previously mentioned risk is minimal. Since the target-directed weapon or weapons being transported can also produce "friendly fire" responses, they too are preferably delay-armed, and if so, the signals that arm them can alternately be used to latch arming relays 491*a*, 491*b* closed.

In the FIG. 4 drawing, amplifiers are shown in each of the outputs of the guidance system and the GPS receiver of interest here, and persons having ordinary skill in the art will recognize that these amplifiers are included in or omitted from the actual embodiments on the basis of the power needed to actuate the relays versus the signal power available. Further, following standard practice with respect to block diagrams, the power supplies for these amplifiers, the guidance system, and the GPS receiver have been omitted from the drawing.

Once arming relay 491*a* is latched closed, the separation sequence for the FIG. 1 or FIG. 1 type countermeasure-discouraging means is initiated by the closing of latching separation relay 492*a*, and relay 492*a* is closed by a signal from guidance system 406 via signal bus 431*a*, or from GPS receiver 450 via bus 451*a*. These separation relay latching signals are sent when the guidance system is unable to confirm course from an arbitrary number of consecutive preprogrammed TERCOM or optical scene match points, say because the TERCOM radar has been jammed or because the scenes that are intended to be matched with the stored ones have been intentionally obscured by smoke, or when the GPS receiver cannot confirm course from an arbitrary number of consecutive preprogrammed "waypoints", say because the GPS signals have been jammed, or when a course error of greater than a predetermined amount is confirmed by the previously mentioned matchings or waypoints, etc. If, however, latching arming relay 491*a* is open, the separation sequence is not initiated until that arming relay is closed.

This FIG. 1 or FIG. 1 type countermeasure-discouraging sequence would, of course, also be initiated when optical scene sensors are unintentionally blinded, say by clouds, fog, darkness, smoke from fires, etc. While weapon transport devices dependent upon optical scene sensors for precise delivery of their target-intended payloads would not normally be used under the conditions mentioned, those limitations do not apply to radar. Radar can, however, be jammed, and TERCOM is the updating system of choice where targets are land-based and fixed because it facilitates target approach by cruise missiles at altitudes so low that its radar is not easily jammed.

The FIG. 2 or FIG. 2 type countermeasure-discouraging means are, it will be recalled, separated as a kind of reward for withholding countermeasures, and even then, only when the weapon transport device passes a predetermined point on its path toward its target, that point preferably being one beyond which the target-intended weapons being transported can successfully attack their targets.

Thus the separation sequence here is initiated when latching separation relay 492*b* is closed by a signal from guidance system 406 via signal bus 431*b*, or one from GPS receiver 450 via bus 451*b* confirming that the transport device has passed the previously mentioned point, and then only if latching inhibit relay 493*b* which, unlike the others, latches open when actuated, remains closed. Relay 493*b* is actuated by a signal from guidance system 406 via bus 432*b*, or from GPS receiver 450 via bus 452*b*, and these actuating signals are, as is clear from FIG. 4, also those that close latching separation relay 492*a* when, as mentioned, the course confirmation sensors are blinded or the course error exceeds a predetermined amount.

The drawing of FIG. 4 shows two separate and independent means for supplying the signals that initiate the separation sequences, the guidance system and the GPS receiver, and while the redundancy introduced thereby may be of interest, the more important reason for so doing is to make it clear that, for most embodiments of this invention, these signals can be supplied by the GPS receiver alone. Thus this invention can be practiced with cruise missiles without connecting to their guidance systems, with ballistic missiles that have purely ballistic target approach phases or purely inertial guidance systems, as part of "add-on" countermeasure-discouraging systems for existing weapons or weapon transport devices, etc.

There are, however, embodiments of this invention that cannot be served by GPS-derived signals. These include "smart" bombs that are intended to home in on laser-illuminated or electro-optically (TV) imaged targets but cannot do so because these targets are intentionally obscured by smoke, and missiles that are intended to home in on moving targets such as ships via radar but cannot do so because that radar is jammed. The FIG. 4 embodiment does, however, initiate activation of the countermeasure-discouraging means via signals from guidance system 406 when the electromagnetic sensors of that system, here the lasers, the TVs, and the radars previously mentioned, are blinded, and would do so in lieu of GPS-derived signals here.

While the new, novel, and useful features of this invention have been described in detail with reference to embodiments of the weapon transport devices known as TOMAHAWK cruise missiles, these embodiments and their descriptions are intended to be illustrative rather than limiting, the actual scope of the invention being defined by the appended claims.

In both these descriptions and the claims, the term "hostile territory" refers not only to land-based areas such as enemy countries, but also to portions of the sea around enemy vessels such as a carrier and her escorts; the term "propulsion means" refers not only to air-breathing or rocket engines, but also to the propulsion means for "smart" bombs and MIRVs, i.e., the momentum imparted by the launch means and gravity; the term "electromagnetic sensor" refers to the radar, laser, infrared or visible-image-receiving portions of the guidance systems for the weapon transport devices of this invention; and the term "blinded" refers to electromagnetic sensors that cannot perform as expected because of countermeasures such as jamming or smoke.

I claim:

1. A weapon transport device for transporting a target-intended weapon along a path toward a target in hostile territory, said device comprising:

(a) means, different from said weapon and separable therefrom, for attacking the occupants of said territory in response to countermeasures against said weapon transport device;

(b) means for propelling said transport device along at least a portion of said path;

(c) a guidance system incorporating a sensor for providing information for guiding said transport device along at least a portion of said path;

(d) means for separating at least a portion of said means for attacking said occupants from said weapon;

(e) means for sensing countermeasures against said weapon transport device;

(f) means for at least one of initiating and inhibiting said separation in response to said means for sensing countermeasures against said weapon device, wherein said means for sensing comprises means for sensing an occurrence selected from the group consisting of said transport device strays by more than a predetermined distance from said path, said sensor is blinded, and said transport device passes beyond a predetermined point while en route to said and target without sensing a countermeasure.

2. The weapon transport device of claim 1, wherein said means for sensing further comprises means for sensing signals from said guidance system.

3. The weapon transport device of claim 1, further comprising a GPS receiver, and wherein said means for sensing comprises means for sensing signals from said GPS receiver when said occurrence comprises one of said transport device strays by more than a predetermined distance from said path and said transport device passes beyond a predetermined point while en route to said target without sensing any countermeasures.

4. The weapon transport device of claim 1, wherein said means for attacking said occupants is selected from the group consisting of a biological agent and a chemical agent.

5. The weapon transport device of claim 1, wherein said means for attacking said occupants comprises a first means for attacking and a second means for attacking, said second means being different from said first means and from said weapon and being separable therefrom, and wherein said device further comprises means for separating said second means from said first means and from said weapon, and means for at least one of initiating and inhibiting said separation of said second means.

6. The weapon transport device of claim 1, wherein said target-intended weapon is salvage-fused.

7. The weapon transport device of claim 1, wherein said means for separating is selected from the group consisting of explosive bolts, explosive bolts and springs, solenoid latches, solenoid latches and springs, spray nozzles, and spray nozzles and means for delivering said means for attacking to said nozzles.

8. The weapon transport device of claim 1, wherein said means for propelling comprises an air-breathing engine and said transport device is a cruise missile.

9. The weapon transport device of claim 1, wherein said means for inhibiting and initiating said separation includes means for inhibiting in friendly territory a separation of said means for attacking said occupants.

10. A process for discouraging countermeasures against a weapon transport device used to transport along a path toward a target in hostile territory, a target-intended weapon, and means, different from said weapon and separable therefrom, for attacking the occupants of said territory in response to said countermeasures again said weapon transport device, said process comprising:

(a) propelling said transport device along at least a portion of said path;

(b) providing a sensor for providing information for guiding said transport device along at least a portion of said path; and (c) at least one of initiating and inhibiting a separation of at least a portion of said means for attacking said occupants from said weapon in response to sensing an occurrence selected from the group consisting of said transport device strays by more than a predetermined distance from said path, said sensor is blinded, and said transport device passes beyond a predetermined point while en route to said target without sensing any countermeasures.

11. The process of claim 10, wherein said transport device further comprises a guidance system, and wherein step (c) further comprises sensing said occurrence using signals from said guidance system.

12. The process of claim 10, wherein said transport device further comprises a GPS receiver, and wherein step (c) further comprises sensing said occurrence using signals from said GPS receiver when said occurrence comprises one of said transport device strays by more than a predetermined distance from said path and said transport device passes beyond a predetermined point while en route to said target.

13. The process of claim 10, wherein said means for attacking said occupants comprises a first means for attacking and a second means for attacking, said second means being different from said first means and from said weapon and being separable therefrom, and said process further comprises the step of separating said second means from said first means and from said weapon when said device passes beyond a predetermined point en route to said target and the step of inhibiting said separation of said second means upon an occurrence selected from the group consisting of said device strays by more than a predetermined distance from said path and said sensor is blinded.

14. A process for discouraging countermeasures against a weapon transport device used to transport along a path toward a target in hostile territory, a target-intended weapon, a first means incinerable by said weapon and separable therefrom, for attacking the occupants of said territory, and a second means scatterable by the detonation of said weapon and separable therefrom, for attacking said occupants, the process comprising the steps of:

(a) propelling said transport device along at least a portion of said path;

(b) providing a sensor for providing information for guiding said transport device along at least a portion of said path;

(c) separating at least a portion of said first means from said weapon;

(d) separating at least a portion of said second means from said weapon;

(e) initiating said separation of said portion of said second means when said transport device passes beyond a predetermined point while en route to said target; and (f) initiating said separation of said portion of said first means and inhibiting said separation of said portion of said second means upon an occurrence selected from the group consisting of said transport device strays by more than a predetermined distance from said path and said sensor is blinded.

15. The process of claim 14, wherein said transport device further comprises a guidance system, and wherein said steps (e) and (f) are activated by signals from said guidance system.

16. The process of claim 14, wherein said transport device further comprises a GPS receiver, and wherein said steps (e) and (f) are activated by signals from said GPS receiver upon an occurrence selected from the group consisting of said transport device strays by more than a predetermined distance from said path and said transport device passes beyond a predetermined point while en route to said target.

* * * * *